United States Patent [19]

Tanahashi

[11] Patent Number: 5,550,831
[45] Date of Patent: Aug. 27, 1996

[54] TDMA SATELLITE COMMUNICATION SYSTEM FOR TRANSMITTING SERIAL SUBSIGNAL DATA

[75] Inventor: Katsuhiko Tanahashi, Kawasaki, Japan

[73] Assignee: Fujitsu Limited, Kawasaki, Japan

[21] Appl. No.: 207,258

[22] Filed: Mar. 8, 1994

Related U.S. Application Data

[63] Continuation of Ser. No. 835,588, Feb. 14, 1992, abandoned.

[30] Foreign Application Priority Data

Feb. 15, 1991 [JP] Japan ................................ 3-044347

[51] Int. Cl.⁶ ........................................... H04J 3/12
[52] U.S. Cl. .................. 370/95.3; 370/105.4; 370/110.4; 370/112
[58] Field of Search ............................. 370/110.1, 110.4, 370/105.1, 105.4, 112, 95.1–3, 79; 371/55, 70; 375/365, 366, 368; 379/230, 229

[56] References Cited

U.S. PATENT DOCUMENTS

| | | | |
|---|---|---|---|
| 4,054,753 | 10/1977 | Kaul et al. | 370/95.3 |
| 4,414,662 | 11/1983 | Bousquet | 370/105.4 |
| 4,519,073 | 5/1985 | Bertocci et al. | 370/110.1 |
| 4,860,286 | 8/1989 | Forsberg et al. | 371/70 |
| 4,933,672 | 6/1990 | Blanc et al. | 371/55 |
| 4,943,965 | 6/1990 | Machida et al. | 371/55 |
| 5,020,131 | 5/1991 | Isoe | 375/114 |
| 5,023,612 | 6/1991 | Liu | 375/116 |
| 5,046,074 | 9/1991 | Abiven et al. | 375/114 |
| 5,140,618 | 8/1992 | Kinoshita et al. | 375/116 |

*Primary Examiner*—Benedict V. Safourek
*Assistant Examiner*—Chau T. Nguyen
*Attorney, Agent, or Firm*—Staas & Halsey

[57] ABSTRACT

A TDMA satellite communication system transmits serial subsignal data in addition to main signal data and a unique word through each frame of a multiframe transmission line. A transmitting station includes a serial subsignal data generating unit for generating the serial subsignal data by inverting or noninverting, for each frame, the unique word in accordance with original (subsignal) data synchronous with the unique word, and a multiplexing unit for multiplexing the serial subsignal data and the main signal data to transmit to the receiving station. A receiving station includes a demultiplexing unit for separating the main signal data and the preamble, and a unique word detecting unit for detecting the serial subsignal data by comparing the preamble demultiplexed by the demultiplexing unit with a comparison unique word.

15 Claims, 6 Drawing Sheets

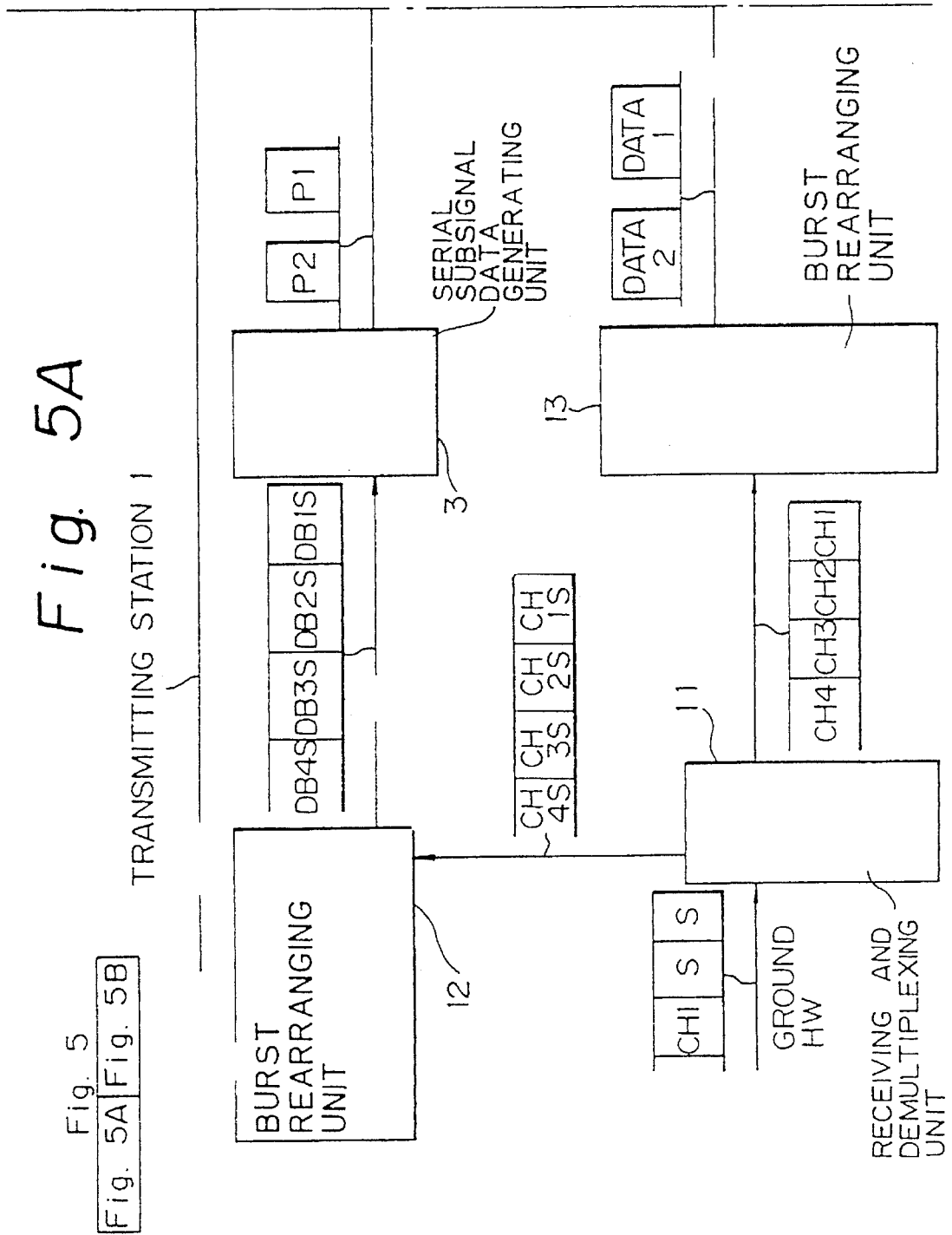

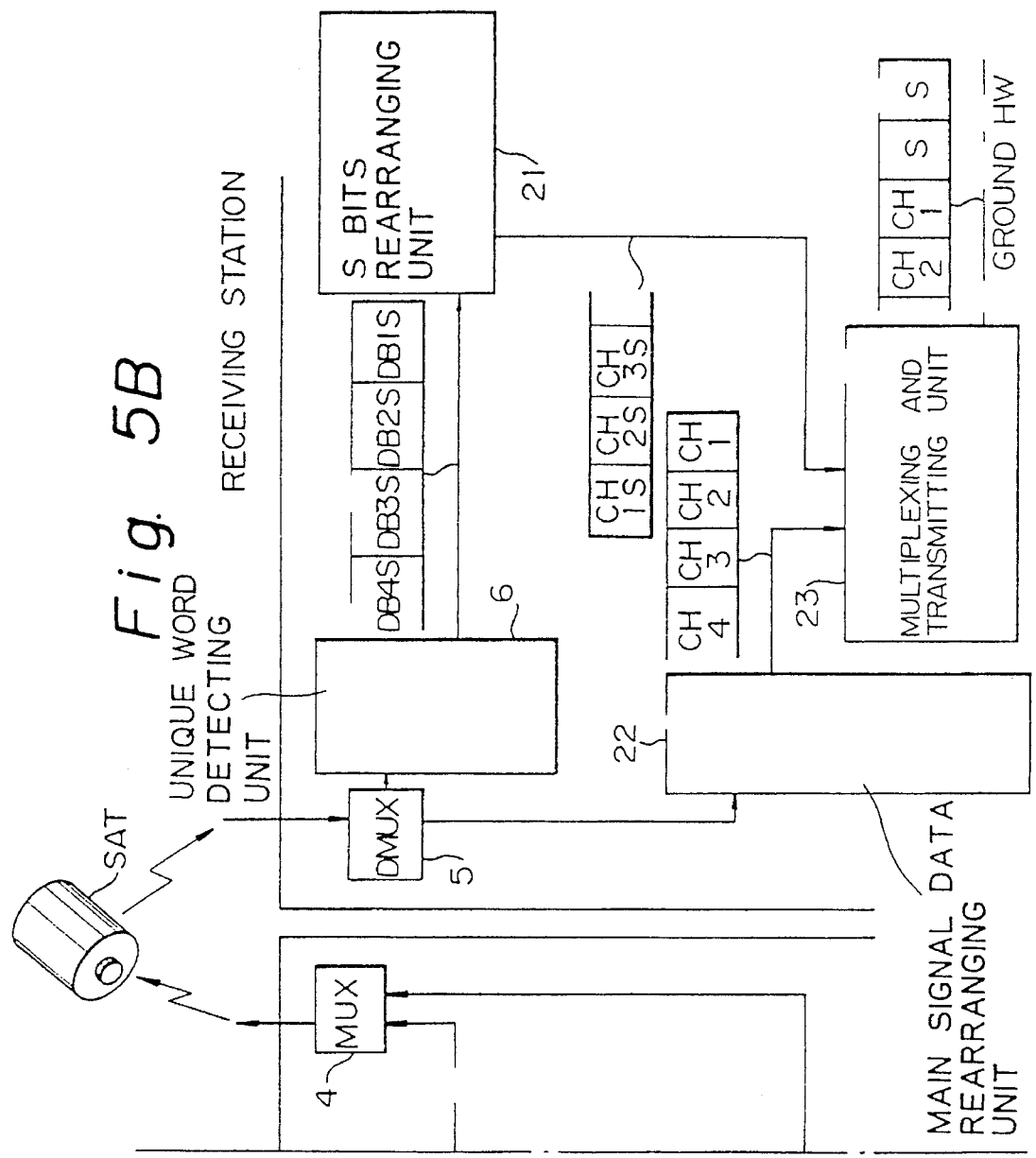

TDMA SATELLITE COMMUNICATION SYSTEM FOR TRANSMITTING SERIAL SUBSIGNAL DATA

This application is a continuation of application Ser. No. 07/835,588, filed Feb. 14, 1992, now abandoned.

BACKGROUND OF THE INVENTION

1. Field of the Invention

The present invention relates to a TDMA (Time Division Multiple Access) satellite communication system for transmitting serial subsignal data, and more particularly to a data transmitting system for transmitting low speed data between stations, between which a high-speed main signal line has been established for TDMA satellite communication.

2. Description of the Related Art

In a satellite communication network, there may be a need to transmit a small amount of subsignal data other than main signal data. The small amount of data may be necessary depending on the operation of a station such as a reference station or a slave station from which the small amount of data is transmitted or by which the small amount of data is received. The small amount of data may be a message generated discontinuously with a non-fixed bit rate. Such small amount of data must be transmitted with a small error rate. Therefore, the small amount of data must be transmitted through a small-capacity data line separate from the main line. Note that the small-capacity data line and the main line in this description are not the real lines but are time slots allocated to a multiplexed data line.

To provide such a small-capacity data line between stations in a frame format including burst data and burst signals for satellite communication, conventionally, a special position for the small-capacity data line is previously allocated, as a burst, for the small-capacity data line, and the previously provided burst small-capacity data line is accessed when necessary by a reference station or a slave station during communication between the reference station and the slave station or between slave stations.

In the conventional system, since the special position for the small-capacity data line is fixed and constantly allocated in the frame format, a percentage of the transfer rate is occupied by the small-capacity data line regardless of whether or not the the special small-capacity data line is used, so that the frame efficiency, which is the ratio between the main signal data rate and the transfer rate, is lowered. In addition, the reliability of the small-capacity data line thus allocated is not high because the error rate of the small-capacity data is almost the same as the error rate of the main signal data. Therefore, when a high-reliability line is required for checking a connection of the main-signal line for example, additional protecting means such as a means for repeating the transmission, a means for receiving a decision concerning reliability of transmission, and so forth must be provided. This is a problem in the conventional art.

SUMMARY OF THE INVENTION

Accordingly, an object of the present invention is to provide, a TDMA (Time Division Multiple Access) satellite communication system used between stations, including a high-speed main signal line and a low-speed data transmitting system without allocating an additional data line other than the main-signal line.

To attain the above object, there is provided, according to the present invention, a transmitting station for transmitting, in response to original data, serial subsignal data in addition to main signal data and a unique word for identifying the head of the main signal data through each frame of a multiframe transmission line. The transmitting station comprises a serial subsignal data generating unit for generating the serial subsignal data by inverting or noninverting, for each frame, the unique word in accordance with the original data synchronous with the unique word, and a multiplexing unit for multiplexing the serial subsignal data and the main signal data to transmit.

According to another aspect of the present invention, there is provided a receiving station for receiving serial subsignal data in addition to main signal data in a TDMA satellite communication system for transmitting data through a multiframe transmission line, each frame of the multiframe transmission line including the main signal data and a preamble including a noninverted or inverted unique word for identifying the head of the main signal data, and the sequence of the noninverted unique word and the inverted unique word forming the serial subsignal data. The receiving station comprises a demultiplexing unit for separating the main signal data and the preamble, and a unique word detecting unit connected to the demultiplexing unit for detecting the serial subsignal data by comparing the preamble demultiplexed by the demultiplexing unit with a unique word.

In the above receiving station, the unique word detecting unit comprises an inverted unique word detecting unit for detecting the inverted unique word and a noninverted unique word detecting unit for detecting the noninverted unique word.

According to still another aspect of the present invention, there is provided a TDMA satellite communication system for transmitting, from the above-mentioned transmitting station to the above-mentioned receiving station, serial subsignal data in response to original data in addition to main signal data, and a unique word for identifying the head of the main signal data through each frame of a multiframe transmission line.

In the above-mentioned TDMA satellite communication system, each frame of the multiframe transmission line further includes a reference burst for discriminating the frame.

The reference burst is inverted for each multiframe in the transmitting station and is transmitted from the transmitting station to the receiving station for discriminating a multiframe.

The unique word detecting unit includes a function for detecting the inverted reference burst.

The unique word detecting unit uses the function for detecting the inverted reference burst.

The serial subsignal generating unit comprises a shift register for loading the unique word in response to a loading timing signal synchronous with the timing of the unique word, a flip-flop for latching the original data in response to a frame timing, and an exclusive OR gate for inverting the unique word when the original data has a first value and for not inverting the unique word when the original data has a second value different from the first value. The output of the exclusive OR gate is the serial subsignal data.

The unique word detecting unit comprises a shift register for loading the inverted or noninverted unique word in response to a transmission clock, a first comparator for comparing the loaded preamble with a noninverted reference unique word, and a second comparator for comparing the loaded preamble with an inverted reference unique word, and a flip-flop for generating the serial subsignal data in response to the output of the first and second comparators.

The unique word detecting unit comprises a shift register for loading the demultiplexed preamble, a comparator for comparing the loaded preamble with a noninverted reference unique word to provide a coincidence or non-coincidence signal, and a flip-flop for generating the serial subsignal data in response to the output of the comparator.

Alternatively, the comparator may be used for comparing the loaded preamble with an inverted reference unique word.

The original data may be signaling bits. In this case, the transmitting station further comprises a demultiplexing unit for demultiplexing main signal data and the signaling bits to be transmitted, a subsignal rearranging unit for rearranging the signaling bits in the sequence of bursts, and a main signal rearranging unit for rearranging the main signal data in the sequence of bursts. The signaling bits in the sequence of bursts are supplied to the serial subsignal data generating unit. The output of the serial subsignal generating unit and the output of the main signal rearranging unit are supplied to the multiplexing unit.

The receiving station further comprises a received subsignal rearranging unit for rearranging the received signaling bits from the preamble detecting unit in the sequence of channels, and a main signal rearranging unit for rearranging the received main signal data from the preamble detecting unit in the sequence of bursts. The output of the received subsignal rearranging unit and the output of the received main signal rearranging unit are supplied to the multiplexing and transmitting unit.

BRIEF DESCRIPTION OF THE DRAWINGS

The above object and features of the present invention will be more apparent from the following description of the preferred embodiment with reference to the accompanying drawings, wherein:

FIG. 5 is a diagram illustrating the positional orientation of FIGS. 5A and 5B; and FIGS. 5A and 5B are block diagrams showing an example of an application of the embodiment of the present invention in which S bits are used as serial-subsignal data transmitted through a ground transmission line.

DESCRIPTION OF THE PREFERRED EMBODIMENT

Figure 1:
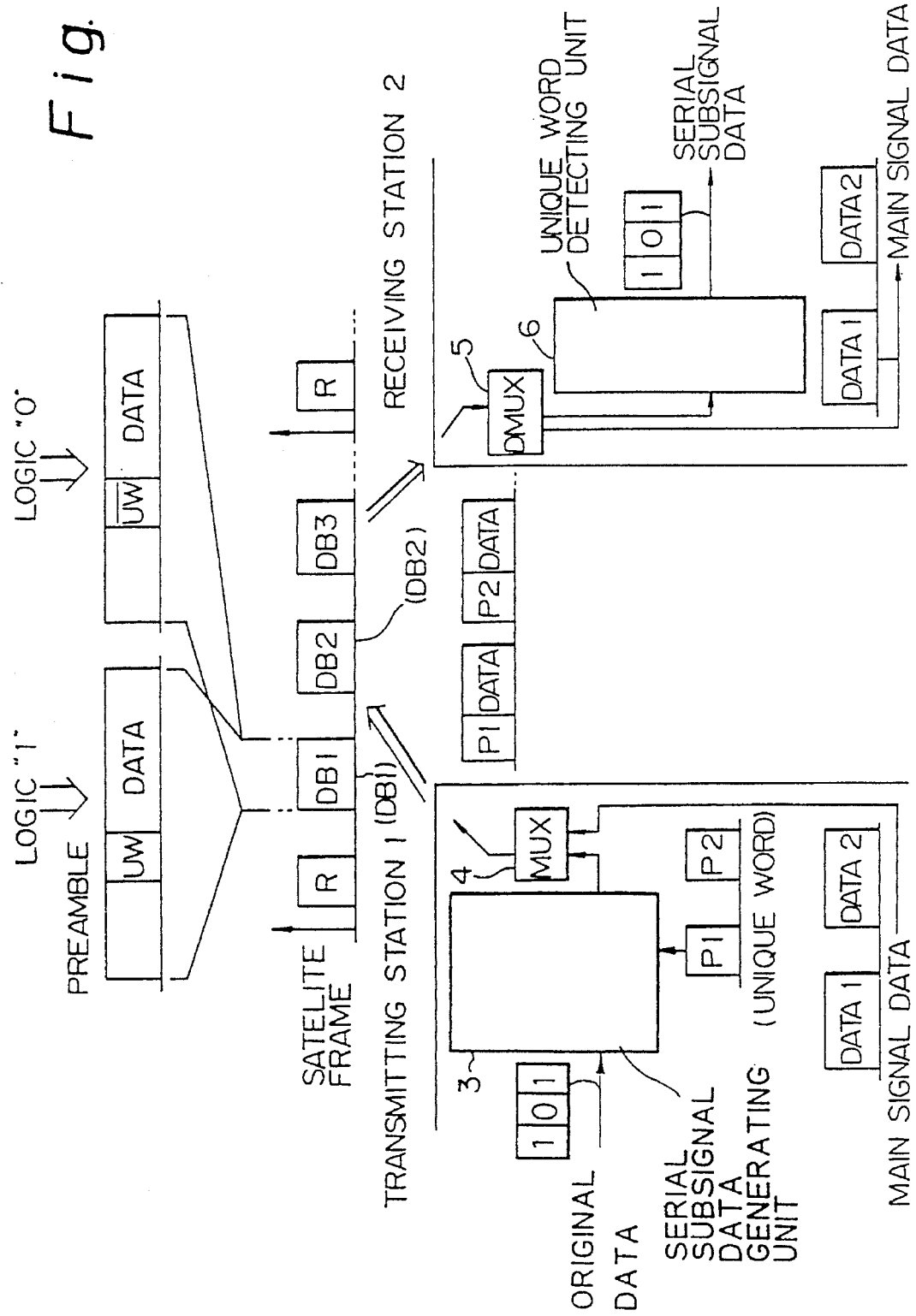
FIG. 1 is a block diagram showing a principle construction of a TDMA satellite communication system according to an embodiment of the present invention.

Referring to FIG. 1, as is well known, each satellite TDMA frame consists of a reference burst R and data bursts DB1, DB2, DB3, . . . The reference burst R is used to transmit signals for frame synchronous control and multiframe synchronous control, system control, and so forth. Each of the data bursts DB1, DB2, DB3, . . . consists of a preamble P and data DATA. In each data burst DB1, DB2, DB3, . . . , the preamble P includes a unique word UW indicating the head of the burst data DATA. Generally, the pattern of the unique word UW is a special pattern consisting of plural bits. At a burst transmitting station, the unique word UW is added to the head of valid data DATA and the frame including the unique word UW and the valid data DATA is transmitted to a burst receiving station. At the burst receiving station, the received data is demultiplexed into the main signal data and the unique word by a demultiplexer 5 and the demultiplexed unique word is compared with a reference unique word with a certain error margin to detect the unique word UW so that the timing of the head of the valid data DATA in each of the data bursts DB1, DB2, DB3, . . . is recognized.

The reference burst R also includes another unique word which has a pattern different from the unique word UW in the data burst DB. It is known that, to identify the head of a multiframe including a plurality of reference bursts R, the pattern of the reference burst R at the head of the multiframe is inverted. The burst transmitting station transmits the frame including the inverted reference burst and the valid data DATA to a receiving station. At the receiving station, the inverted reference burst is detected to identify the head of a multiframe. Therefore, the conventional receiving station includes a function to detect the inverted unique word for the reference burst.

According to the present invention, the inverted pattern detecting function for the reference burst in the receiving station is applied to data bursts DB1, DB2, DB3, . . . other than the reference burst. By, sending a combination of several non-inverted unique words and several inverted unique words, the transmitting station can transmit, without modifying the burst construction, valid subsignal data in addition to the main signal data, and the receiving station can receive the subsignal consisting of plural non-inverted unique words and plural inverted unique worda.

FIG. 1 shows the principle construction of the TDMA satellite communication system for transmitting serial subsignal data according to an embodiment of the present invention. In the figure, the left-hand side shows the transmitting station 1 including a serial subsignal data generating unit 3 for generating the serial subsignal data by logically inverting the pattern of the unique word UW in the data burst DB in accordance with original data to be transmitted, and a multiplexing unit 4 for multiplexing the output of the serial subsignal data generating unit 4 and the main signal data to transmit to the receiving station 2.

The right-hand side shows the receiving station 2 including a demultiplexing unit 5 for demultiplexing from the received signal, the preamble and the main signal data, and a unique word detecting unit 6 for extracting the serial subsignal data by detecting a coincidence between the data in the preamble and a comparing pattern of the noninverted unique word UW, or between the data in the preamble and a comparing pattern of the inverted unique word. Note that the unique word detecting unit 6 functions to receive the noninverted and inverted unique words in the reference bursts. This function can also be used for detecting the noninverted unique and inverted unique words in the data bursts for extracting both the unique word and the serial subsignal data. The relation between the transmitting station 1 and the receiving station 2 may be the relation between the reference station and a slave station or between slave stations, as long as a main signal line is already provided between the stations in accordance with a TDMA preassignment or a TDMA demand assignment.

In operation, when the original data to be transmitted is a logic "1", the preamble generating unit 3 in the transmitting station 1 does not invert the pattern (consisting of n bits) of the unique word UW in the preamble P. When the original data to be transmitted is a logic "0", the preamble generating unit 3 inverts the pattern of the unique word UW in the preamble P. Then, the multiplexer 4 multiplexes the signals output from the preamble generating unit 3 and the main signal data DATA 1, DATA 2, . . . to transmit them as data bursts DB1, DB2, . . .

In the receiving station 2 that has received the data bursts DB1, DB2, . . . through a satellite, the demultiplexer 5 demultiplexes the main signal data DATA 1, DATA 2, . . . and the preambles P1, P2, . . . The unique word detecting unit 6 compares the received bit sequence in the preambles P1, P2, . . . with the noninverted pattern of a comparison unique word and the inverted pattern of the comparison unique word, in the same way that the comparison of the reference burst R is conducted. When the received bit sequence coincides with the noninverted pattern of the comparison unique word, the received subsignal is determined as a logic "1". When the received bit sequence coincides with the inverted pattern of the comparison unique word, the received subsignal is determined as a logic "0". The unique word detecting unit 6 carries out the above-mentioned comparison for each data burst to output the subsignal data.

Under the above-described operation, serial subsignal data of a small amount and a low speed can be transmitted from the transmitting station 1 to the receiving station 2 by using the transmission of the patterns of the unique words in the satellite data bursts. Since the error rate in the unique word detection is lower than the error rate in the main signal data detection in the order of $5 \times 10^3$, the serial subsignal data transmission according to the embodiment of the present invention can be naturally effected with high reliability.

Figure 2:
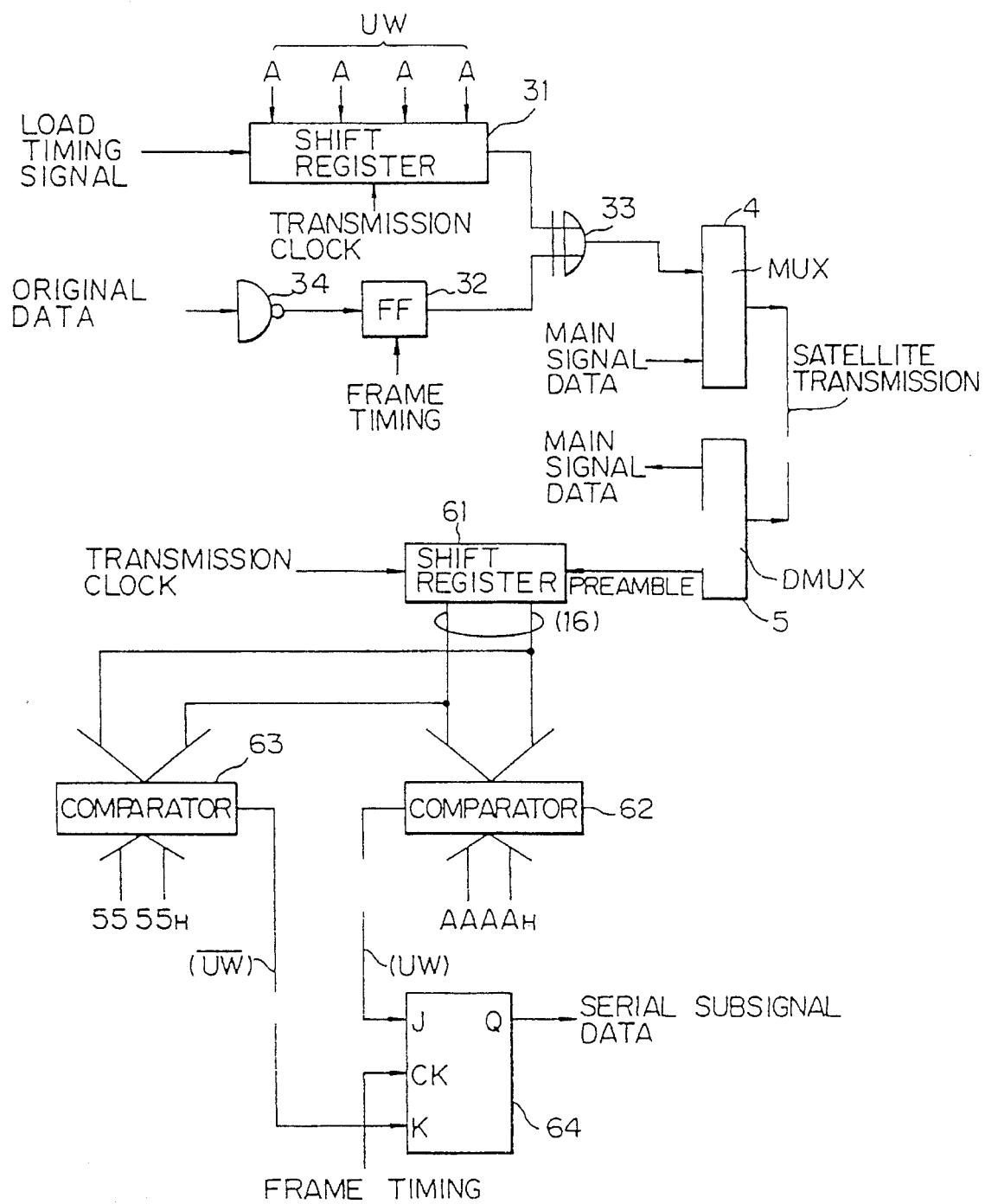
FIG. 2 is a block diagram showing in more detail the construction of the transmitting station and the receiving station in the system shown in FIG. 1.

FIG. 2 shows the construction of the transmitting station 1 and the receiving station 2 in more detail. In FIG. 2, the serial subsignal data generating unit 3 in the transmitting station 1 includes a 16-bit shift register 31 for receiving the unique word UW, a flip-flop (FF) 32 for latching the inverted serial subsignal data to be transmitted, an exclusive OR gate 33 for inverting or noninverting the unique word output from the shift register 31 in accordance with the latched signal from the flip-flop 32, and an inverter 34 for inverting the original data. As an example, the unique word UW is 16 bits data expressed by AAAA as a hexadecimal number.

The unique word detecting unit 6 in the receiving station 2 includes a 16-bit shift register 61 for receiving the preamble separated from the main data by the demultiplexing unit 5, a comparator 62 for comparing the 16-bit of parallel data in the shift register 61 with the noninverted pattern AAAA of the comparing unique word UW, a comparator 63 for comparing the 16-bit of parallel data in the shift register 61 with the inverted pattern 5555 of the comparison unique word UW, and a J-K flip-flop 64 for detecting the serial subsignal data from the output of the comparators 62 and 63.

Figure 3A:
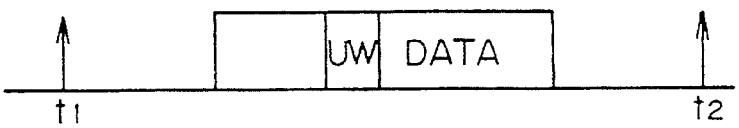
FIGS. 3A to 3I are time charts for explaining the operation of the transmitting station shown in FIG. 2.
Figure 3B:
Figure 3C:
Figure 3D:
Figure 3E:
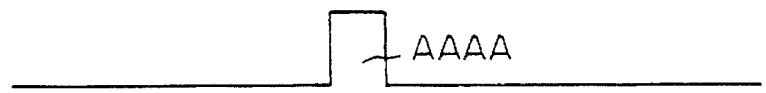
Figure 3F:
Figure 3G:
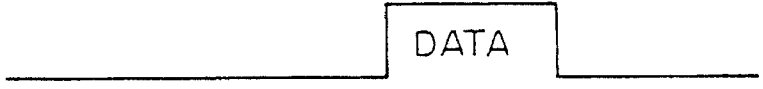
Figure 3H:
Figure 3I:
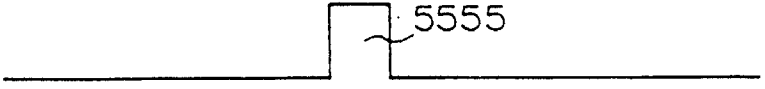

FIGS. 3A to 3I show time charts for explaining the operation of the transmitting station shown in FIG. 2, in which FIG. 3A shows a data burst between times t1 and t2; FIG. 3B shows an example of the original data to be transmitted; FIG. 3C shows the signal latched in the flip-flop 32 when the original data is "1" at the time t1; FIG. 3D shows the load timing applied to the shift register 32; FIG. 3E shows the output of the exclusive OR gate 33 when the original data is "1"; FIG. 3F shows the transmission clock signal applied to the shift register 31; FIG. 3G shows the main signal data input to the multiplexer 4; FIG. 3H is another example of the original data; and FIG. 3I shows the output of the exclusive OR gate 33 when the original data is "0".

First, in the transmission, at the timing t3 corresponding to the start of the unique word UW, the load timing signal as shown in FIG. 3D is applied to the shift register 31 so that the unique word UW having an expression $AAAA_H$ is loaded in the shift register 31. Also, in response to the timing t1, the inverted original "0" is latched in the flip-flop 32. When the original data is "1" at the time of the latching, "0" is latched so that the signals $AAAA_H$ are output from the exclusive OR gate 33 in response to the transmission clock. By contrast, when the original data is "0" at the time of the latching as shown in FIG. 3H, "1" is latched so that the signals $5555_H$ are output from the exclusive OR gate 33 in response to the transmission clock. The multiplexer 4 multiplexes the output of the exclusive OR gate 33 and the main signal data to transmit to the satellite.

On the receiving side, the 16-bits of data corresponding to the unique word UW portion is separated from the main signal data by the demultiplexer 6. The unique word portion is input to the shift register 61 in response to the transmission clock. The 16-bits of data in the shift register 61 are supplied as parallel data to both the comparators 62 and 63 simultaneously. In the comparator 62, the 16-bits data are compared with the comparing unique word $AAAA_H$. In the comparator 63, the 16-bits data are compared with the inverted comparing unique word $5555_H$. As a result, when the original data is "1", the comparator 62 outputs a logic "1" which is input into the J-input of the J-K flip-flop 64 so that the flip-flop 64 outputs logic "1" in response to the frame timing signal. When the original data is "0", the comparator 63 outputs a logic "1" which is input into the K-input of the J-K flip-flop 64 so that the flip-flop 64 outputs logic "0" in response to the frame timing signal. Thus, the subsignal data transmitted from the transmitting station 1 is reproduced in the receiving station 2.

Figure 4:
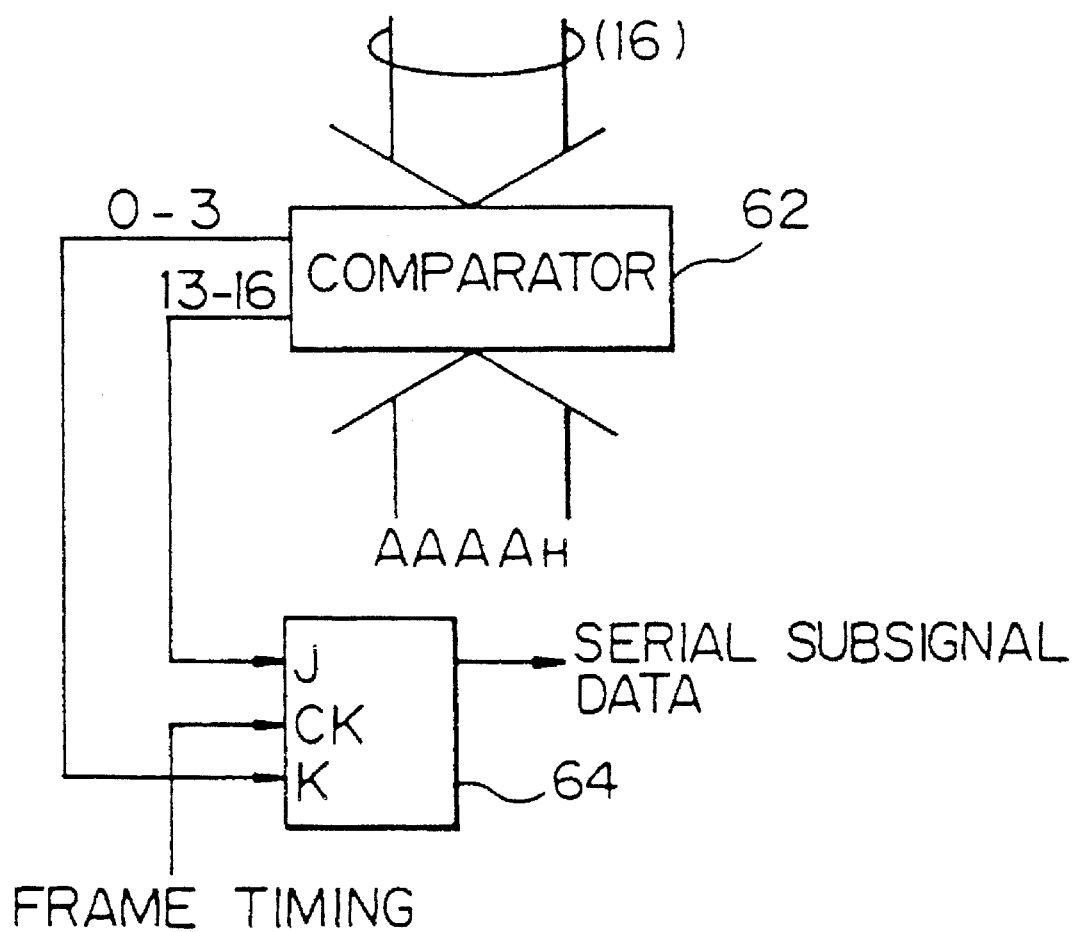
FIG. 4 is a block diagram showing another example of the receiving station shown in FIG. 1.

In the embodiment illustrated in FIG. 2, there are two comparators 62 and 63. As an alternative, a single comparator may be provided as shown in FIG. 4 illustrating another embodiment of the unique word detecting unit 6. In this case, when the 16-bits of data from the transmitting station 1 coincides with the comparing unique word $AAAA_H$, logic "1" is input to the J-input of the flip-flop 64; and when it does not coincide, logic "1" is input to the K-input of the flip flop. It should be noted that, in practice, there is an error margin allowed in the comparison. For example, among the 16 bits of the unique word, only the least significant three bits may be used for detecting noncoincidence and only the most significant three bits may be used for detecting coincidence. The error of margin is also considered, in practice, in the comparators 62 and 63 in FIG. 2.

FIGS. 5A and 5B are an example of the application of the present invention in which the original data to be transmitted are S-bits, which are signaling bits provided to correspond to channels in a ground highway in a satellite communication system for transmitting and receiving data through the ground highway by dividing the data into channels.

In this example of the application, the transmitting station 1 includes, in addition to the above-described serial subsignal data generating unit 3 and the multiplexing unit 4, a receiving and demultiplexing unit 11 for receiving the S bits that correspond to the channels from the ground highway HW and for demultiplexing the S bits and the main signal data in the channels CH1, CH2, . . . , a rearranging unit 12 for rearranging the S bits so as to correspond to the bursts and for transmitting the rearranged S bits to the serial subsignal data generating unit 3, and a rearranging unit 13 for rearranging the main signal data of each channel so as to correspond to the bursts and for transmitting the rearranged main signal data to the multiplexing unit 4.

The receiving station 2 includes, in addition to the demultiplexing unit 5 and the unique word detecting unit 6, an S-bits rearranging unit 21 for rearranging the S bits detected by the unique word detecting unit 6 so as to correspond to the channels, a main-signal data rearranging unit 22 for rearranging the main signal data demultiplexed by the demultiplexer 5 so as to correspond to the channels, and a multiplexing and transmitting unit 23 for multiplexing the outputs of the S-bits rearranging unit 21 and the main-signal data rearranging unit 22 to transmit through the ground highway HW.

In operation of the transmitting station 2 shown in FIG. 5A, the receiving and demultiplexing unit 11 carries out a synchronization protection on the S bits that are multiplexed and transmitted through the ground highway HW, and then demultiplexes the S bits from the main signal data. In the S-bits rearranging unit 12, the S bits arranged in the sequence corresponding to the channels are rearranged in a sequence of the bursts on which the S bits are sent. The main signal data separated from the S bits by the receiving and demultiplexing unit 11 are rearranged to correspond to the bursts and transmitted to the multiplexing unit 4. In the serial subsignal data generating unit 3, the above-described inverting or noninverting process is carried out on each unique word in accordance with the S bit from the rearranging unit 12. Namely, when the S bit to be transmitted is "1", the unique word is not inverted; and when the A bit is "0", the unique word is inverted. The inverted or noninverted unique words, which are the sequence of the S bits to be transmitted, are multiplexed with the main signal data by the multiplexer 4. The multiplexed data are sent to the receiving station.

In the receiving station 2 in FIG. 5B, the process is the reverse of the process in the transmitting station 1. Namely, in the S-bits rearranging unit 21, the received S bits in the form of the inverted or noninverted unique words are detected by the unique word detecting unit 6. The outputs of the unique word detecting unit 6 are the received S bits in the form of the inverted or noninverted unique words that are in the sequence corresponding to the bursts. The S bits from the unique word detecting unit 6 are rearranged in the S-bits rearranging unit 21 so as to correspond to the channels. Also, in the main signal data rearranging unit 22 the main signal data separated from the S bits by the demultiplexer 6 is rearranged to correspond to the channels. The S bits and the main signal data both corresponding to the channels are multiplexed and transmitted through the ground highway HW by the multiplexing and transmitting unit 23.

As described above, according to the present invention, in the transmitting station, subsignal data can be transmitted by logically inverting or noninverting unique words in accordance with original data to be transmitted as a preamble which is different from the main signal data; and in the receiving station, the received signal is separated into the main signal data and the preamble and the original data are extracted by comparing the subsignal data in the preamble with a comparison unique word. Therefore, without allocating an additional bit transmitting location in the burst format of the satellite frame, a small amount of original data can be transmitted as serial subsignal data. As a result, the frame efficiency of the satellite frame is improved. Further, without depending on the satellite format, a serial subsignal data line can be provided between the transmitting station and the receiving station. In particular, since the bit rate of the serial subsignal data line according to the present invention is the same as the frame rate of the satellite frame, the bit error rate of the serial subsignal data line is very low and can be easily obtained.

What is claimed is:

1. A transmitting station for transmitting frames of data including main signal data, said transmitting station comprising:

serial subsignal data generating means for generating serial subsignal data by selectively inverting, for each frame, a unique word identifying when said main signal data starts in each frame of a multiframe transmission, in accordance with the value of a bit in original data synchronized with said unique word in said transmitting station; and multiplexing means for multiplexing said serial subsignal data and said main signal data for transmission.

2. A receiving station in a time division multiple access satellite communication system using multiframe transmission of data frames, each frame including main signal data and a preamble including a unique word identifying when said main signal data starts, said receiving station comprising:

demultiplexing means for separating in each of the data frames, said main signal data and said preamble; and unique word detecting means, operatively connected to said demultiplexing means, for detecting a bit of serial subsignal data included in one of the data frames by comparing the unique word in said preamble demultiplexed by said demultiplexing means with a comparison unique word to determine whether the unique word in said preamble matches an inverted comparison unique word.

3. A receiving station as claimed in claim 2, wherein said unique word detecting means comprises:

inverted unique word detecting means for detecting an inverted unique word in said preamble; and noninverted unique word detecting means for detecting a noninverted unique word in said preamble.

4. A time division multiple access satellite communication system for transmitting frames of data in a multiframe transmission, comprising:

a transmitting station to transmit in each frame of the multiframe transmission main signal data and a preamble having a unique word indicating when said main signal data of the multiframe transmission in each frame starts, including serial subsignal data generating means for generating said preamble including a bit of serial subsignal data by selectively inverting, for each frame, said unique word in accordance with the value of a bit in original data synchronized with generation of said preamble; and multiplexing means for multiplexing said preamble and said main signal data for transmission; and a receiving station to receive the multiframe transmission, including demultiplexing means for separating said main signal data and said preamble; and unique word detecting means, operatively connected to said demultiplexing means, for detecting the bit of said serial subsignal data by comparing said preamble demultiplexed by said demultiplexing means with a comparison unique word.

5. A time division multiple access satellite communication system as claimed in claim 4, wherein said unique word detecting means comprises:

inverted unique word detecting means for detecting an inverted unique word in said preamble; and noninverted unique word detecting means for detecting the unique word in said preamble.

6. A time division multiple access satellite communication system as claimed in claim 5, wherein each frame of said multiframe transmission further includes a reference burst including another unique word for discriminating said frame.

7. A time division multiple access satellite communication system as claimed in claim 6, wherein the unique word in said reference burst of a specific frame is inverted for each multiframe in said transmitting station and transmitted from said transmitting station to said receiving station for discriminating the multiframe.

8. A time division multiple access satellite communication system as claimed in claim 7, wherein said unique word detecting means includes inverted reference burst detecting means for detecting an inverted unique word in said reference burst.

9. A time division multiple access satellite communication system as claimed in claim 4, wherein said original data to be transmitted are signaling bits.

10. A time division multiple access satellite communication system as claimed in claim 9, wherein said transmitting station further comprises:

demultiplexing means for demultiplexing said main signal data and said signaling bits to be transmitted, subsignal rearranging means for rearranging said signaling bits in a sequence of bursts, said signaling bits in the sequence of bursts being supplied to said serial subsignal data generating means, and main signal rearranging means for rearranging the main signal data in the sequence of bursts, to produce an output supplied to said multiplexing means for multiplexing with said serial subsignal data.

11. A time division multiple access satellite communication system as claimed in claim 9, wherein said receiving station further comprises:

received subsignal rearranging means for rearranging the signaling bits detected by and output from said unique word detecting means in a sequence of channels, main signal rearranging means for rearranging said main signal data output from said demultiplexing means in the sequence of channels, and multiplexing and transmitting means for receiving the signaling bits rearranged by said received subsignal rearranging means and the main signal data rearranged by said received main signal rearranging means for multiplexing and transmitting.

12. A time division multiple access satellite communication system for transmitting frames of data in a multiframe transmission, comprising:

a transmitting station to transmit in each frame of the multiframe transmission main signal data and a preamble having a unique word indicating when said main signal data of the multiframe transmission in each frame starts, including serial subsignal data generating means for generating said preamble including a bit of serial subsignal data by selectively inverting, for each frame, said unique word in accordance with the value of a bit in original data synchronized with generation of said preamble, said serial subsignal generating means including a shift register for loading said unique word in response to a loading timing signal synchronized with timing of said unique word, a flip-flop for latching said original data in response to a frame timing signal, and an exclusive OR gate, operatively connected to said shift register, said flip-flop and said multiplexing means, for inverting said unique word when said original data has a first value and for not inverting said unique word when said original data has a second value different from said first value, to produce said serial subsignal data; and multiplexing means for multiplexing said preamble and said main signal data for transmission; and a receiving station to receive the multiframe transmission, including demultiplexing means for separating said main signal data and said preamble; and unique word detecting means, operatively connected to said demultiplexing means, for detecting the bit of said serial subsignal data by comparing said preamble demultiplexed by said demultiplexing means with a comparison unique word.

13. A receiving station in a time division multiple access satellite communication system using multiframe transmission of data frames, each frame including main signal data and a preamble including a unique word identifying when said main signal data starts, said receiving station comprising:

demultiplexing means for separating in each of the data frames, said main signal data and said preamble; and unique word detecting means, operatively connected to said demultiplexing means, for detecting a bit of serial subsignal data included in one of the data frames by comparing the unique word in said preamble demultiplexed by said demultiplexing means with a comparison unique word to determine whether the unique word in said preamble matches an inverted comparison unique word, said unique word detecting means including a shift register, operatively connected to said demultiplexing means, for loading said preamble including one of inverted and noninverted unique words in response to a transmission clock signal, a first comparator, operatively connected to said shift register, for comparing said preamble with a noninverted reference unique word to produce an output signal indicative of the noninverted unique word in said preamble, a second comparator, operatively connected to said shift register, for comparing said preamble with an inverted reference unique word to produce an output signal indicative of the inverted unique word in said preamble, and a flip-flop, operatively connected to said first and second comparators, for generating said serial subsignal data in response to the output signals of said first and second comparators.

14. A time division multiple access satellite communication system for transmitting frames of data in a multiframe transmission, comprising:

a transmitting station to transmit in each frame of the multiframe transmission main signal data and a preamble having a unique word indicating when said main signal data of the multiframe transmission in each frame starts, including serial subsignal data generating means for generating said preamble including a bit of serial subsignal data by selectively inverting, for each frame, said unique word in accordance with the value of a bit in original data synchronized with generation of said preamble; and multiplexing means for multiplexing said preamble and said main signal data for transmission; and a receiving station to receive the multiframe transmission, including demultiplexing means for separating said main signal data and said preamble; and unique word detecting means, operatively connected to said demultiplexing means, for detecting the bit of said serial subsignal data by comparing said preamble demultiplexed by said demultiplexing means with a comparison unique word, said unique word detecting means including a shift register, operatively connected to said demultiplexing means, for loading said preamble, a comparator, operatively connected to said shift register for comparing said preamble with a non-inverted reference unique word to provide one of a coincidence and a noncoincidence signal, and a flip-flop, operatively connected to said comparator, for generating said serial subsignal data in response to the coincidence and noncoincidence signals output by said comparator.

15. A time division multiple access satellite communication system for transmitting frames of data in a multiframe transmission, comprising:

a transmitting station to transmit in each frame of the multiframe transmission main signal data and a preamble having a unique word indicating when said main signal data of the multiframe transmission in each frame starts, including serial subsignal data generating means for generating said preamble including a bit of serial subsignal data by Selectively inverting, for each frame, said unique word in accordance with the value of a bit in original data synchronized with generation of said preamble; and multiplexing means for multiplexing said preamble and said main signal data for transmission; and a receiving station to receive the multiframe transmission, including demultiplexing means for separating said main signal data and said preamble; and unique word detecting means, operatively connected to said demultiplexing means, for detecting the bit of said serial subsignal data by comparing said preamble demultiplexed by said demultiplexing means with a comparison unique word said unique word detecting means including a shift register, operatively connected to said demultiplexing means, for loading said preamble, a comparator, operatively connected to said shift register, for comparing said preamble with an inverted reference unique word to provide one of a coincidence and a noncoincidence signal, and a flip-flop, operatively connected to said comparator, for generating said serial subsignal data in response to the coincidence and noncoincidence signals output by said comparator.

* * * * *